United States Patent [19]

Fukami et al.

[11] Patent Number: 4,604,657

[45] Date of Patent: Aug. 5, 1986

[54] APPARATUS FOR PROCESSING PCM SIGNAL

[75] Inventors: Tadashi Fukami, Yokohama; Kentaro Odaka, Kawasaki, both of Japan

[73] Assignee: Sony Corporation, Tokyo, Japan

[21] Appl. No.: 662,410

[22] PCT Filed: Jan. 31, 1984

[86] PCT No.: PCT/JP84/00025

§ 371 Date: Oct. 1, 1984

§ 102(e) Date: Jan. 1, 1984

[87] PCT Pub. No.: WO84/02999

PCT Pub. Date: Aug. 2, 1984

[30] Foreign Application Priority Data

Jan. 31, 1983 [JP] Japan .................................. 58-14335

[51] Int. Cl.⁴ .......................... G11B 5/00; G11B 5/09; G11B 27/02; H04J 3/06
[52] U.S. Cl. ...................................... 360/32; 360/14.3
[58] Field of Search ........................... 360/32, 13, 14.3

[56] References Cited

U.S. PATENT DOCUMENTS

| | | | |
|---|---|---|---|
| 4,234,896 | 11/1980 | Onishi et al. | 360/32 |
| 4,309,726 | 1/1982 | Tanaka et al. | 360/32 |
| 4,403,263 | 9/1983 | Kageyama et al. | 360/32 |
| 4,423,441 | 12/1983 | Ozaki | 360/13 |
| 4,466,029 | 8/1984 | Tanaka | 360/13 |

*Primary Examiner*—Vincent P. Canney
*Attorney, Agent, or Firm*—Lewis H. Eslinger

[57] ABSTRACT

A PCM signal processing apparatus provides compensation processing so that no pulse noise (abnormal sound) is generated by the reproduction of erroneous data (e.g., unerased data) that has not been recognized as an error by an error detecting code added to the data. The format of the transmission data processed by the apparatus is such that one block of data is constituted by a plurality of PCM data items, and one segment of data is constituted by a plurality of blocks, each block being provided with a data error detecting code (CRC) and a segment address (S-ADR) to which the block belongs. A detection circuit (15) is provided which detects whether or not the segment addresses of reproduced data within each block within one segment are the same. When the detection circuit (15) detects a non-coincidence, an interpolation circuit (13) is actuated in response to the detection output and effects some form of compensation processing, such as mean value interpolation, higher-order interpolation, or the holding of the previous value.

9 Claims, 10 Drawing Figures

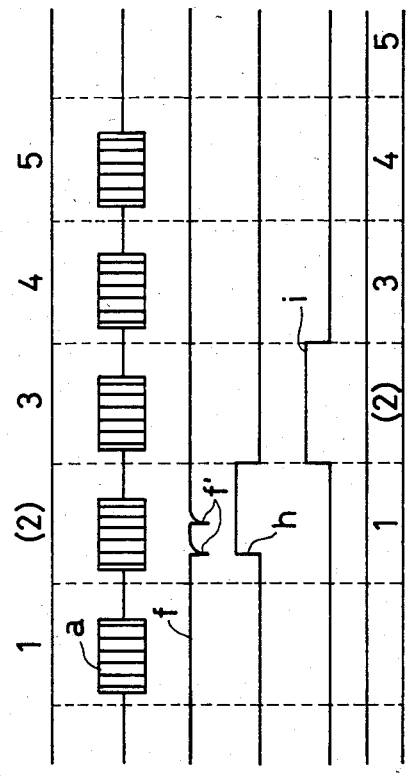

APPARATUS FOR PROCESSING PCM SIGNAL

TECHNICAL FIELD

The present invention relates to an apparatus for processing a PCM signal and, more particularly, to an apparatus suitably used in an apparatus for recording-/reproducing a PCM audio signal.

BACKGROUND ART

In a PCM recorder for recording/reproducing a PCM audio signal, a few words each comprising 16-bit data are given as one block. A data error detection/correction code such as a CRC and a parity word is added to each block for detection and correction of a read error bit in the reproduction mode. Normal random and burst errors can be corrected to proper data by using an error detection correction code. However, when a great number of errors occur and cannot be corrected, the error positions are detected, and error correction such as interpolation processing and the holding of the previous value is performed. The interpolation is performed by using two data values adjacent to error data.

On the other hand, error data which is neither detected nor corrected as an error is present. Assume a PCM signal is recorded on a recording medium such as a magnetic tape and the recorded PCM signal is erased to record another PCM signal. When the previous PCM signal is not completely erased due to the presence of dust or the like and the partially left previous PCM signal is reproduced, it cannot be detected as an error by an error detection/correction circuit (check circuit). As a result, error correction or compensation will not be performed, and pulse noise (abnormal sound) such as click noise inherent to PCM recording is generated. In a VTR system using a magnetic tape and rotary heads, when the recorded tape is reproduced at a speed (e.g., slow play or fast play) different from that in the recording mode, or mistracking occurs, the rotary head scans across a plurality of tracks. In this case, an error is neither detected nor corrected. Therefore, an abnormal sound caused by pulse noise is produced.

DISCLOSURE OF INVENTION

It is an object of the present invention to provide an apparatus for processing a PCM signal, wherein the above problem is solved, and errors which cannot be detected by only an error detecting code can be detected to prevent noise generation.

In an apparatus for processing a PCM signal according to the present invention, a plurality of PCM data constitute one block data, and a plurality of blocks constitute one segment data. Each block includes a data error detecting code and a segment address representing a location of the block in the segment. The apparatus comprises a detection circuit for detecting a coincidence/non-coincidence of the segment address for each block in one segment, thereby correcting the data in accordance with a non-coincidence detection signal. Error data which cannot be detected by only an error detecting code can thus be detected to prevent pulse noise from being generated. Therefore, high-quality signal processing can be performed.

BRIEF DESCRIPTION OF DRAWINGS

FIG. 5, consisting of 5A–5F, is a timing chart for explaining the operation of the circuits shown in FIGS. 3 and 4.

BEST MODE OF CARRYING OUT THE INVENTION

An embodiment will be described wherein the present invention is applied to a rotary head type audio PCM recording/reproducing apparatus.

Figure 1:
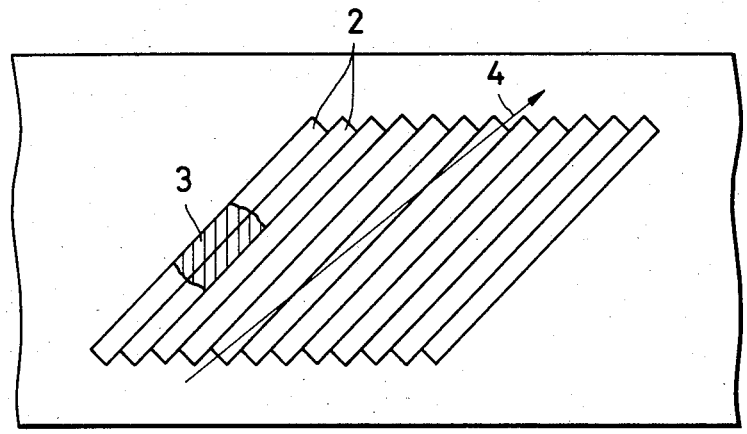
FIG. 1 is a plan view showing part of a magnetic tape used as a recording medium in an audio PCM recording/reproducing apparatus according to an embodiment of the present invention.

FIG. 1 is a plan view showing part of a magnetic tape 1 used as a recording medium. The magnetic tape is wound around a rotary head drum by an angular interval of about 90°+α. Tracks 2 are alternately formed by two rotary heads having different azimuth angles so as to record audio PCM signals. A sampled value (one word) of the audio signal is quantized for every 16 bits. For example, 6-word data constitutes one block, and 256-block data is recorded in a single track. One-track data is called one segment.

Figure 2:
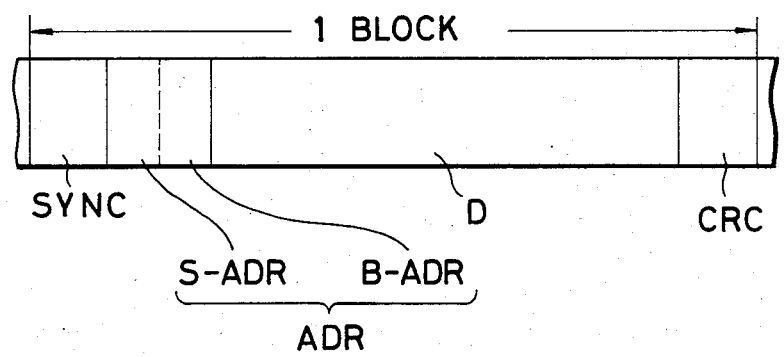
FIG. 2 shows a format of one-block data recorded in a track of the magnetic tape.

FIG. 2 shows a data format of one block. Each block starts with a data sync SYNC. Address data ADR follows the data sync SYNC. Data D consisting of a few words is inserted after the address data ADR. Parity words P and Q are included in this data. A CRC code (error detecting code) for the data D is added to the data D. The data sync SYNC, the address data ADR and the CRC code constitute one block. The address data ADR consists of a segment address S-ADR and a block address B-ADR. The segment address S-ADR is identical throughout one segment (track) and is incremented in units of tracks. The block address is incremented in units of blocks. In other words, the block address is reset for every segment and changes from 1 to 256 within the same segment.

In the audio PCM recording/reproducing apparatus of the present embodiment, non-detectable error data which cannot be detected by CRC check is detected by using the segment address S-ADR in the reproduction mode. The reproduced signal is then processed (to be described later) in accordance with the detection result. Such non-detectable error data is generated when previous data partially left as indicated by a hatched portion 3 in FIG. 1 is reproduced, or when the rotary heads scan across a plurality of tracks in a different speed reproduction mode, as indicated by an arrow 4 in FIG. 1. In either case, no error is detected in accordance with a CRC check. Therefore, error correction and error concealment (compensation) are not performed in a conventional apparatus, resulting in pulse noise.

Figure 3:
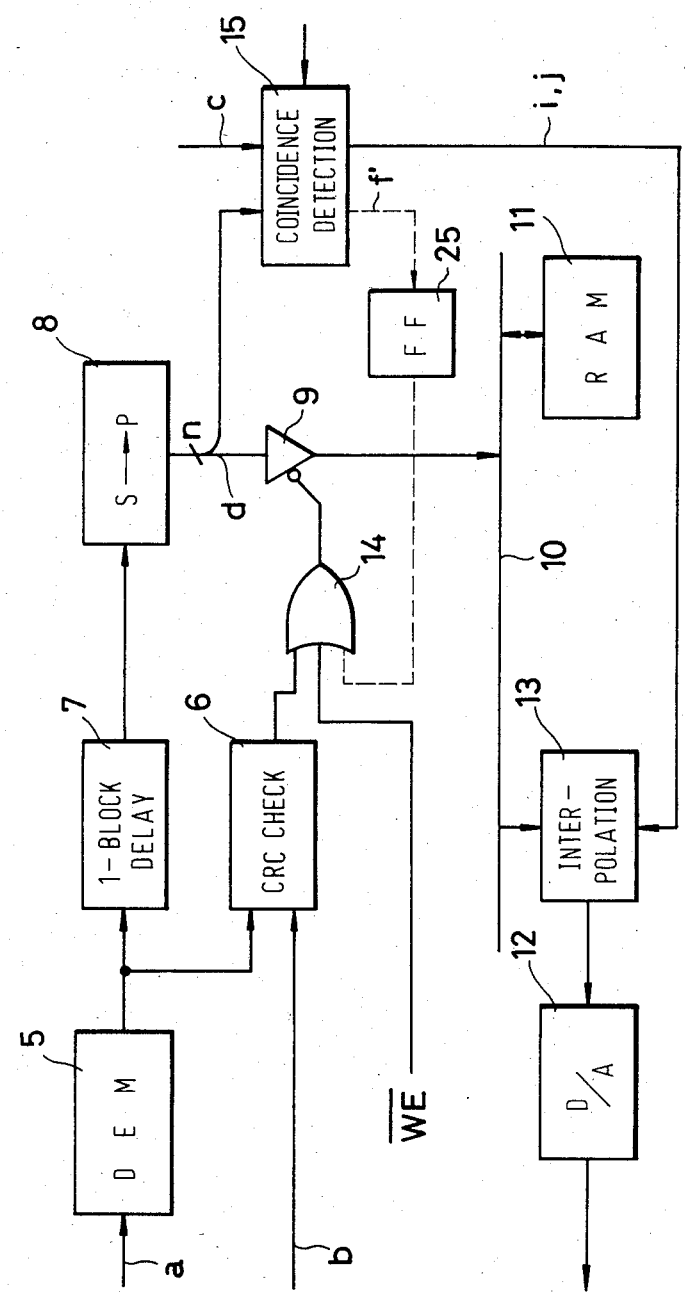
FIG. 3 is a block diagram showing the main part of an error detecting system of the recording/reproducing apparatus of the embodiment.
Figure 4:
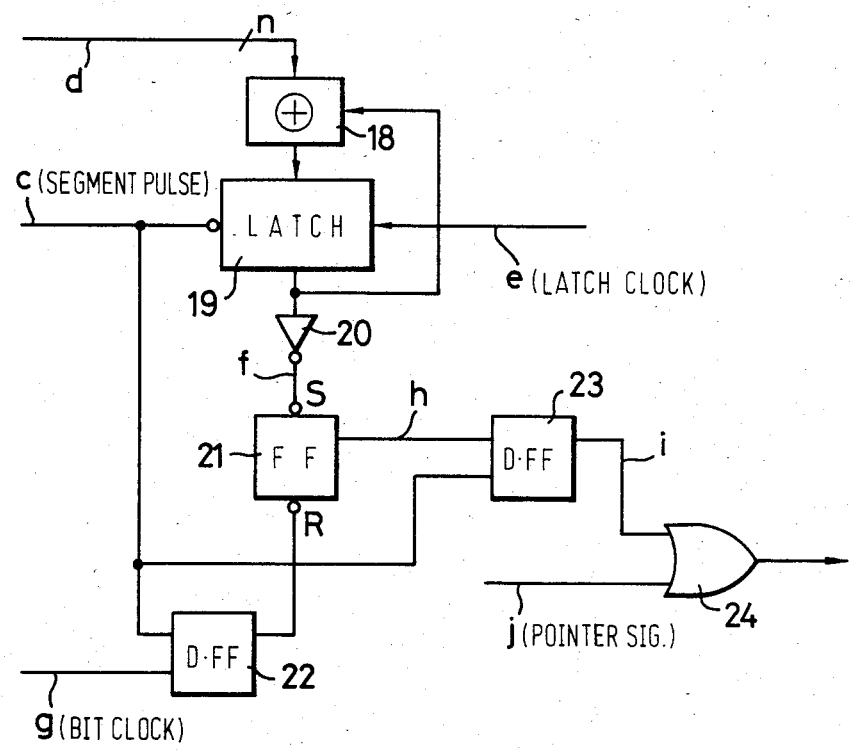
FIG. 4 is a block diagram of a coincidence detection circuit shown in FIG. 3.

FIG. 3 is a block diagram showing the main part of the error detection system in the recording/reproducing apparatus according to this embodiment of the present invention, FIG. 4 is a block diagram of a coincidence detection circuit in FIG. 3, and FIG. 5 is a timing chart for explaining the operation of the circuits shown in FIGS. 3 and 4.

Referring to FIG. 3, a reproduction signal a shown in FIG. 5B is intermittently generated from a rotary head (not shown) in units of segments. The reproduction signal a is supplied to a CRC check circuit 6 through a demodulation circuit 5. The CRC check circuit 6 checks for every block whether or not an error is present. An output from the demodulation circuit 5 is delayed by a one-block delay circuit 7 until the CRC check result is obtained. A delayed output is supplied to a serial/parallel conversion circuit 8. A parallel output d from the circuit 8 is stored in a tristate buffer 9 (n-bit parallel) and a RAM 11 through an internal data bus 10.

The written data is subjected to processing such as deinterleaving or error correction. The processed data is then supplied to a D/A converter 12 through the internal data bus 10 and an interpolation circuit 13. The D/A converter 12 converts the processed data to an analog audio signal.

When the CRC check circuit 6 detects that error data is included in a given block, a check output (high level) is supplied to the tristate buffer 9 through an OR gate 14. This buffer is disabled so as to inhibit writing of the error data in the RAM 11. At the same time, a pointer representing the error portion is set, and error correction is performed by using proper data in the RAM 11 and the error correction codes (P and Q parity words). The CRC check circuit 6 is reset by a reset signal b for every block. When the output from the CRC check circuit 6 is set low (proper data is obtained), a write enable signal WE is supplied to the tristate buffer 9 through the OR gate 14. This buffer is turned on (enabled) to gate the proper data.

On the other hand, as shown in FIG. 3, an n-bit parallel output d from the serial/parallel conversion circuit 8 is supplied to the coincidence detection circuit 15. Coincidence/non-coincidence detection of the segment address S-ADR shown in FIG. 2 is performed for every block by coincidence detection circuit 15. The coincidence detection circuit 15 has a one-block interval latching means to be described in detail in FIG. 4. The coincidence detection circuit 15 detects a coincidence/non-coincidence between the segment address data of a given block which is stored in the latch means and the segment address data of the immediately preceding block.

Assume that part of the left portion indicated by the hatched portion 3 in FIG. 2 is reproduced, or that the rotary head scans across a plurality of tracks. The reproduced data is actually error data. Although the CRC check circuit 6 cannot detect this error data, the coincidence detection circuit 15 detects a non-coincidence of the segment address S-ADR, so that the error data can be detected. A non-coincidence output from the coincidence detection circuit 15 is supplied to the interpolation circuit 13, and the interpolation circuit 13 performs processing such as a mean value interpolation (primary interpolation), nth-order interpolation or 0th-order interpolation (holding of the previous value). Thus, pulse noise will not be mixed in the reproduced sound, thereby obtaining a high quality reproduced sound. Muting may be performed in place of interpolation.

The detailed arrangement of the coincidence detection circuit 15 is shown in FIG. 4. The n-bit parallel output d from the serial/parallel conversion circuit 8 shown in FIG. 3 is latched by a latch circuit 19 through an n-bit parallel exclusive OR gate 18. This latch circuit 19 is reset for every segment in response to a segment pulse c shown in FIG. 5A. The latch circuit 19 latches the data for every block in response to a latch clock e. The segment pulse may be formed by a 60-Hz reference signal synchronized with rotation of the head or a control signal recorded at an edge of the tape 1. The latch clock e may be a pulse formed in accordance with the data sync SYNC provided in each block shown in FIG. 2.

An output from the latch circuit 19 is fed back to the input of the exclusive OR gate 18. Therefore, when segment address data A-ADR latched by the latch circuit 19 coincides with the segment address data of the next block, an output from the exclusive OR gate 18 goes low. Therefore, data in the latch circuit 19 becomes all—0. A logical OR of each bit in the latch data is supplied to a flip-flop 21 through an inverter 20. When the segment address data of every two adjacent blocks coincide with each other, an output f from the inverter 20 is set at high level, as shown in FIG. 5C.

When a non-coincidence between the segment addresses is detected, any one of the bits of the output from the exclusive OR gate 18 goes high, so that the corresponding bit of the data in the latch circuit 19 is set at logic "1". Therefore, an output from the inverter 20 goes low when a non-coincidence is detected, as shown in f' in FIG. 5C. This non-coincidence pulse f' is generated at blocks located at the front and rear ends of the hatched portion 3 in FIG. 1.

The flip-flop 21 is set in response to the non-coincidence pulse f', as shown in FIG. 5D and is reset in response to the next segment pulse c. The reset pulse for the flip-flop 21 is produced by a D flip-flop 22 in accordance with the segment pulse c and a bit clock g.

An output h (FIG. 5D) from the flip-flop 21 is supplied to a D flip-flop 23 and is delayed by one segment, as shown in FIG. 5E. The delayed signal is supplied as an interpolation signal i to the interpolation circuit 13 of FIG. 3 through an OR gate 24. The interpolation circuit 13 interpolates the entire segment including the error data among the output data from the RAM 11. The output data (FIG. 5F) from the D/A converter 12 is delayed by one segment with respect to the reproduced data shown in FIG. 5B, due to PCM processing such as deinterleaving or error correction. The timing of the interpolation signal i delayed by one segment by the D flip-flop 23 corresponds to the error data which may appear in the output from the D/A converter 12.

A pointer signal j representing an error data portion which is left uncorrected by error detection/correction using the CRC and the parity words is supplied to the other input of the OR gate 24. The above-mentioned interpolation operation is performed at a position of the uncorrected error data which is represented by the pointer signal j.

Indirect interpolation is performed by performing interpolation using the pointer when segment addresses do not coincide. For example, as indicated by the dotted line in FIG. 3, a JK flip-flop 25 is arranged to receive the non-coincidence pulse f' (FIG. 5C) from the coincidence detection circuit 15 and generates a pulse corresponding to a non-coincidence interval of f'—f'. When an output from the JK flip-flop 25 is supplied to the OR gate 14, the tristate buffer 9 is kept off during the non-coincidence interval of the segment address, so data will not be written in the RAM 11. For this portion, error correction using the correction code cannot be performed in the RAM 11. In this case, the pointer is set at logic "1", and the pointer signal j is supplied to the interpolation circuit 13 through the OR gate 24 in FIG. 4. As a result, error concealment is performed for the non-coincident portion.

The rotary head PCM recording/reproducing apparatus to which the present invention is applied has been described. However, the present invention can also be applied to a fixed head audio PCM recording/reproducing apparatus. In this case, data consisting of 256 blocks is defined as one segment, and a single segment address is assigned to the blocks of one segment. Data correction is performed at the address non-coincident portion in the same manner as described above.

According to the present invention, the segment address is assigned to the data of blocks belonging to a given segment and the coincidence/non-coincidence of the segment addresses of every two adjacent blocks is detected. Therefore, even if the error data cannot be detected by the data error detection code in the given segment, the error data can be detected to prevent generation of pulse noise, thereby obtaining a high quality reproduction signal.

We claim:

1. An apparatus for processing a PCM data signal, wherein one-segment of data consists of a plurality of blocks, and each block consists of a plurality of PCM data and a segment address that is the same for each block in a given segment, characterized in that said apparatus comprises a coincidence detection circuit receiving said PCM data signal for detecting a coincidence/non-coincidence of the segment address between every two adjacent blocks of a given segment and producing a non-coincidence signal when said segment addresses do not coincide, and compensating means for performing data compensation in response to said non-coincidence signal from said detection circuit.

2. An apparatus according to claim 1, characterized in that each block includes a data error detecting code and said apparatus comprises an error detection circuit receiving said PCM data for detecting the presence of errors in said PCM data in one block in response to the data error detecting code and for generating a detection signal for use in inhibiting passage therethrough of PCM data containing an error.

3. An apparatus according to claim 2, characterized in that said error detection circuit includes a data gate and an error code checker, said error code checker being operable to detect an error in the PCM data in one block in response to the data error detecting code and for generating said detection signal fed to control said data gate.

4. An apparatus according to claim 3, characterized in that said apparatus comprises a memory device, and a data write operation in said memory device is inhibited by said data gate when the detection signal from said error detection circuit represents error data in one block.

5. An apparatus according to claim 4, characterized in that the data is supplied to said memory device through a one-block delay circuit.

6. An apparatus according to claim 1, characterized in that said coincidence detection circuit comprises one-block interval latch means receiving said PCM data and detects a coincidence/non-coincidence between segment address data latched by said latch means and segment address data of a next block in a same given segment.

7. An apparatus according to claim 1, characterized in that said compensating means includes an interpolation circuit.

8. An apparatus according to claim 1, characterized in that said compensating means includes muting means.

9. An apparatus according to claim 1, wherein said apparatus comprises a memory device, and data write operation in said memory device is inhibited in response to a non-coincidence signal from said coincidence detection circuit.

* * * * *